United States Patent
Benz et al.

[11] Patent Number: 5,804,457
[45] Date of Patent: Sep. 8, 1998

[54] METHOD FOR MANUFACTURING A FORCE SENSOR

[76] Inventors: Gerhard Benz, Brucknerstr. 8, 71032 Boeblingen; Franz Laermer, Witikoweg 9, 70437 Stuttgart; Andrea Schilp, Seelenbachweg 15, 73525 Schwaebisch; Erich Zabler, Brunhildstr. 11, 76297 Stutensee; Jürgen Schirmer, Adolf-Rausch-Str. 6, 69124 Heidelberg; Werner Uhler, Augsteinerstr. 11, 76646 Bruchsal, all of Germany

[21] Appl. No.: 659,694

[22] Filed: Jun. 5, 1996

Related U.S. Application Data

[62] Division of Ser. No. 303,099, Sep. 8, 1994, Pat. No. 5,553,506.

[30] Foreign Application Priority Data

Sep. 29, 1993 [DE] Germany ............... 43 33 099.1

[51] Int. Cl.$^6$ ............................... H01L 21/77
[52] U.S. Cl. ................ 437/228 SEN; 437/901; 437/921; 148/DIG. 159
[58] Field of Search ................ 437/249, 901, 437/921, 974, 228 SEN; 148/DIG. 12, DIG. 135, DIG. 159

[56] References Cited

U.S. PATENT DOCUMENTS

| 5,316,619 | 5/1994 | Mastrangelo | 437/919 |
| 5,438,875 | 8/1995 | Fung et al. | 437/901 |
| 5,508,231 | 4/1996 | Ball et al. | 437/974 |
| 5,543,349 | 8/1996 | Kurtz et al. | 437/901 |

*Primary Examiner*—Michael Trinh
*Attorney, Agent, or Firm*—Kenyon & Kenyon

[57] ABSTRACT

In a force sensor, a resonator is mounted by means of a dielectric layer on a bending element. Deformation of the bending element changes the resonant frequency of the resonator.

10 Claims, 2 Drawing Sheets

METHOD FOR MANUFACTURING A FORCE SENSOR

This application is a division of application Ser. No. 08/303,099, filed on Sep. 8, 1994, now U.S. Pat. No. 5,553,506.

FIELD OF THE INVENTION

The present invention relates to a force sensor having a bending element and a resonator arranged on the bending element.

BACKGROUND INFORMATION

A force sensor having a bending element and a resonator arranged on the bending element is described in an article by Tilmans et al., "A Differential Resonator Design using a Bossed Structure for Applications in Mechanical Sensors," *Sensors and Actuators* 25–27 (1991), pp. 385–393. The vibration frequency of the resonator changes due to deformation of the bending element. As shown in FIG. 5 of Tilmans et al., force sensors of this kind are machined from one piece of brass in a complex structuring process.

SUMMARY OF THE INVENTION

According to the present invention, by arranging a plurality of resonators on one bending element, the sensitivity of the force sensor can be increased and the necessary analysis circuit can be simplified. The resonator is composed of two mounting blocks with a vibratory element arranged between them. Both the piezoelectric effects and the force between objects at different potentials can be used as a means for vibratory excitation. Both the bending element and the resonator can be structured out of superimposed silicon layers. The quality of the resonator can be improved, and the sensitivity of the sensor thus increased, by arranging the resonator in a cavity.

An advantage of the force sensor of the present invention is that the force sensor can be produced easily and economically. The cost advantages familiar from semiconductor technology, resulting from parallel manufacture of a plurality of elements on one semiconductor substrate, can thereby be fully realized.

Also considered advantageous is the method for manufacturing a force sensor. Sensor elements composed of monocrystalline materials exhibit essentially no material fatigue phenomena, so that sensor elements manufactured therewith are particularly resistant to aging.

DETAILED DESCRIPTION

Figure 1:
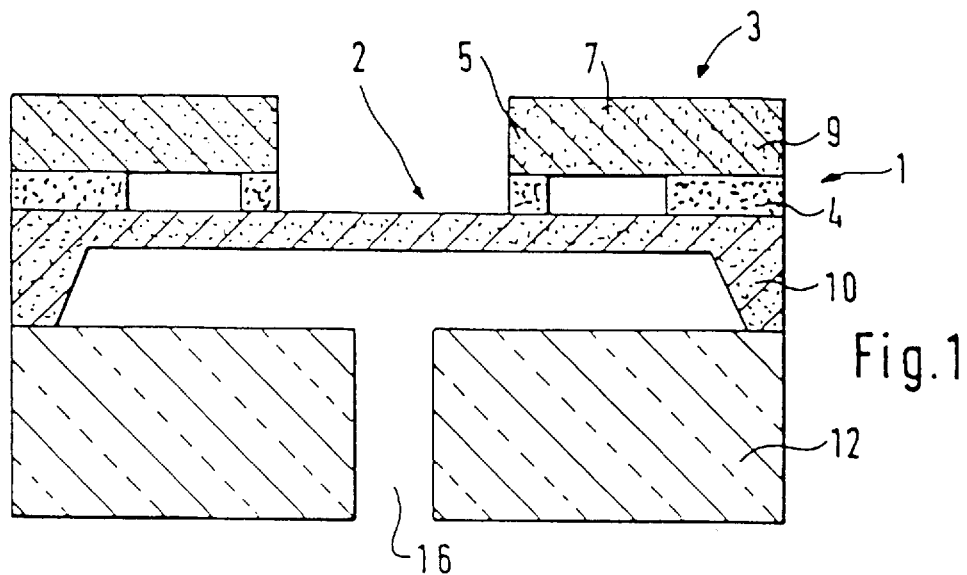
FIG. 1 shows a cross section of a first exemplary embodiment of the force sensor according to the present invention.

Referring to FIG. 1, there is shown a force sensor 1 that includes resonators 3 on a bending element 2 configured as a membrane. A structured dielectric layer 4 is arranged between resonators 3 and bending element 2.

Both resonators 3 and bending element 2 are structured out of a first silicon layer 9 and a second silicon layer 10. As is evident from FIG. 1, force sensor 1 is applied onto a glass block 12 that has a pressure orifice 16. A pressure can pass through pressure orifice 16 onto the underside of bending element 2, and thus deform the bending element configured as a membrane.

Figure 2:
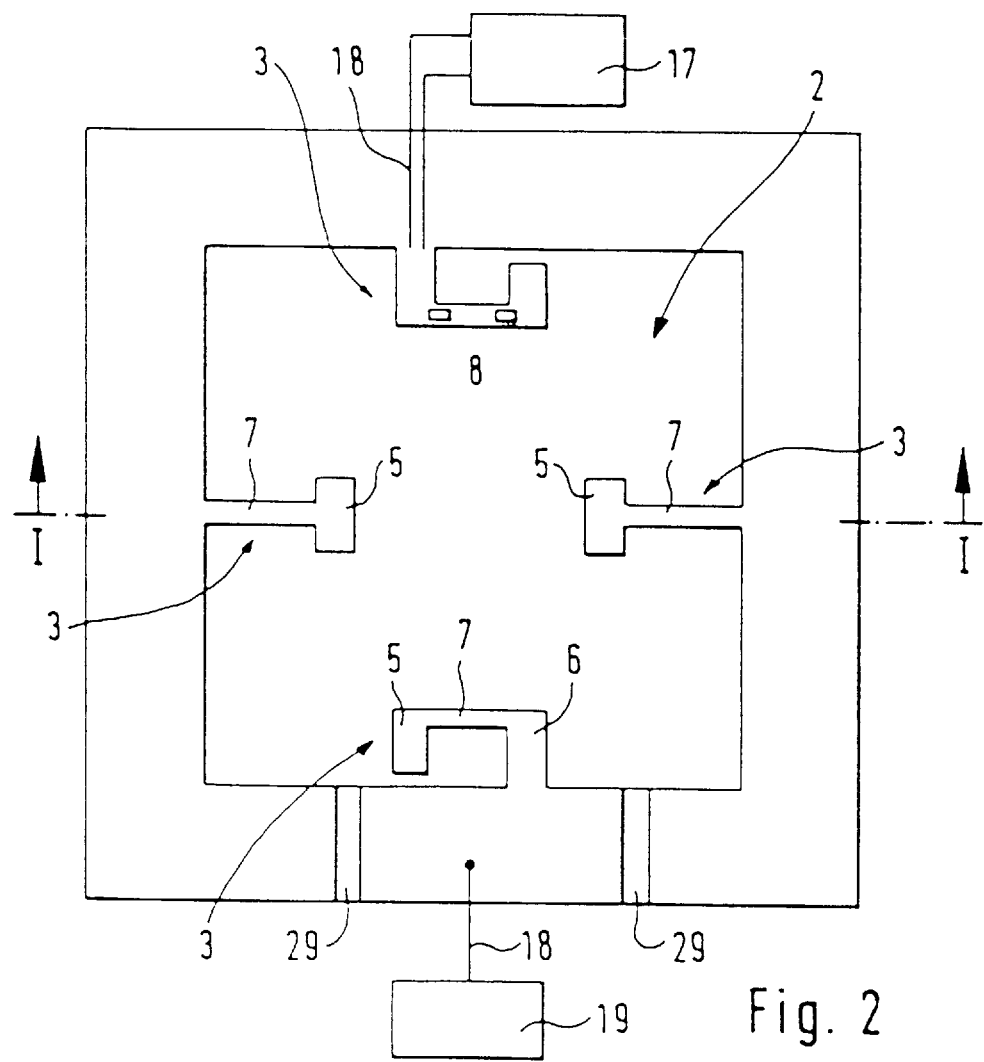
FIG. 2 shows a plan view of the force sensor of FIG. 1.

The configuration of resonator 3 is shown in more detail in FIG. 2. Each of the resonators 3 has a first mounting block 5 and a second mounting block 6. A vibratory element 7 is arranged between the two mounting blocks 5 and 6. For the two resonators 3 shown in section in FIG. 1, one mounting block 5 is arranged on bending element 2 configured as a membrane, while the second mounting block consists of a frame surrounding bending element 2. As is evident from the cross section in FIG. 1, the two mounting blocks 5 and 6 are permanently connected via dielectric layer 4 to bending element 2 and to second silicon layer 10, while vibratory elements 7 can move freely. Vibratory elements 7 can, for example, be excited to vibrate by means of applied piezoelectric layers 8.

For this purpose, the piezoelectric layers 8 are connected with conductor paths (not shown here) to an electrical oscillator in such a way that feedback occurs between the mechanical vibration of vibratory element 7 and the electrical oscillator vibration. This feedback mechanism tunes the electrical vibration of the oscillator to the mechanical resonant frequency of vibratory element 7. Deformation of bending element 2 configured as a membrane generates mechanical stresses in resonators 3. These mechanical stresses can include either of tensile stresses (i.e. the two mounting blocks 5 and 6 are pulled apart) or compressive stresses (i.e. the two mounting blocks 5 and 6 are pressed together). In both cases the stresses that are generated influence the resonant frequency of vibratory elements 7.

A measurement of the vibrations of resonators 3 can provide information as to the mechanical deformation of bending element 2. The configuration as shown in FIG. 1, with a membrane-like bending element 2 and glass block 12 with a pressure orifice 16, is intended as a sensor to detect pressure differences. Similar elements are, however, possible for the detection of accelerations or other forces, without requiring substantial changes in the configuration of force sensor 1.

Referring now to FIG. 2, there is shown four resonators arranged on membrane-like bending element 2 in such a way that two resonators are subject to tensile stresses and two resonators to compressive stresses. When bending element 2 deflects, the frequencies of the tensile-stressed resonators change with a different sign from the frequencies of the compressive-stressed resonators. The difference in frequencies can be analyzed. Furthermore, temperature-related frequency changes in resonators 3 occur in the same way, so that they do not influence the measurement result when the difference is analyzed.

An electrical oscillator 17 is connected by supply leads 18, which are drawn only schematically here, to the piezoelectric layers 8. Another method of generating vibrations is shown by oscillator 19, which is connected via one supply lead 18 to a resonator. The resonator connected to oscillator 19 is isolated from the remainder of the first silicon layer 9 by grooves 29. Grooves 29 extend completely through first silicon layer 9 to dielectric layer 4. Furthermore, oscillator 19 is connected to second silicon layer 10. It is thus also possible to generate vibrations of vibratory element 7 by applying electrical voltage between resonator 3 and second silicon layer 10.

Figure 3:
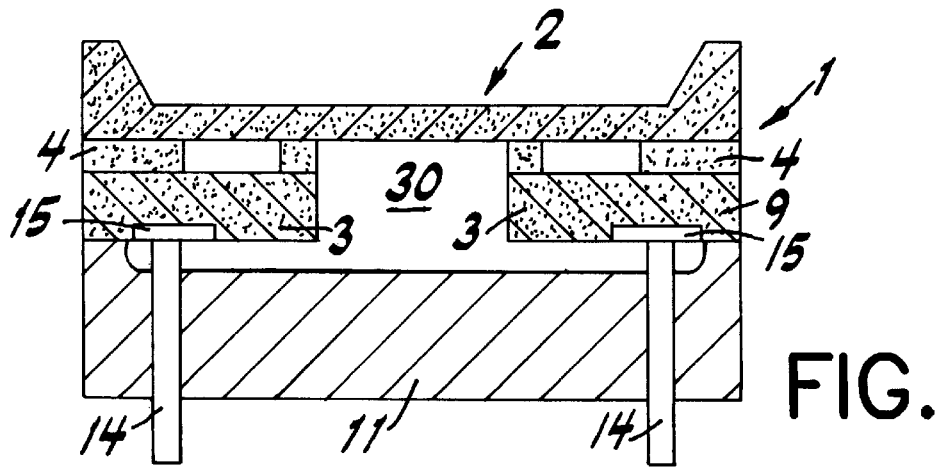
FIG. 3 shows a cross section of a second exemplary embodiment of the force sensor according to the present invention.

Referring now to FIG. 3, there is shown another exemplary embodiment of force sensor 1 according to the invention. This force sensor also has a bending element 2 to which two resonators 3 are connected via a dielectric layer 4. The edge region of first silicon layer 9 is connected to a plate 11. Set into the plate 11 are metal leadthrough pins 14 with which doped regions 15 or metal conductor paths (Al, AlSi, etc.) make contact. Piezoelectric layers (not shown here) are in turn arranged on resonators 3. The configuration shown here operates similarly to the force sensor shown in FIGS. 1 and 2. Exertion of pressure on membrane-like bending element 2 causes deformation of bending element 2, which results in a change in the vibrational frequency of resonator 3.

Since plate 11 and force sensor 1 form a closed cavity 30, the force sensor shown here operates as an absolute pressure sensor (i.e. it measures an external pressure against the pressure enclosed in cavity 30). It is advantageous that resonator 3 is also enclosed in cavity 30. As a result, resonator 3 and an hybrid logic circuit that may possibly be integrated with it are particularly well protected. They are thus shielded from contamination and mechanical damage.

Furthermore, the vibratory quality of resonators 3 can be improved by the fact that a particularly low pressure is present in cavity 30, thus eliminating damping of resonator 3 by air. A vacuum of this kind can easily be produced in cavity 30 if the bond between first silicon layer 9 and plate 11, which for example can consist of glass, is made by "anodic bonding." In anodic bonding, plate 11 is laid on first silicon layer 9 and then joined by heating while an electrical potential is applied. This process can also occur in a vacuum, and leads to thermally tight sealing of the vacuum in the cavity.

Figure 4:
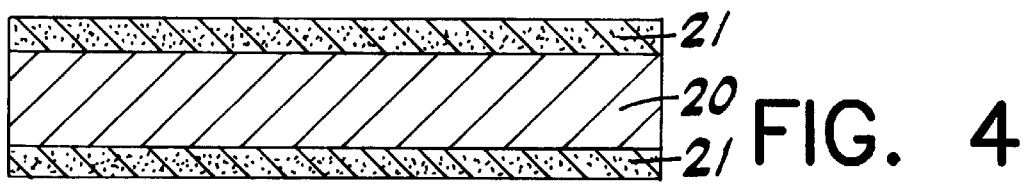
FIGS. 4 to 6 illustrate a first exemplary embodiment of the method of manufacturing a force sensor according to the present invention.

Referring now to FIG. 4, there is shown a silicon wafer 20 that is coated on its top and bottom sides with a silicon oxide layer 21. The thickness of the silicon wafer 20 is on the order of a few hundred micrometers, while the thickness of the oxide layers 21 is on the order of a few tenths of a micrometer to a few micrometers.

Figure 5:
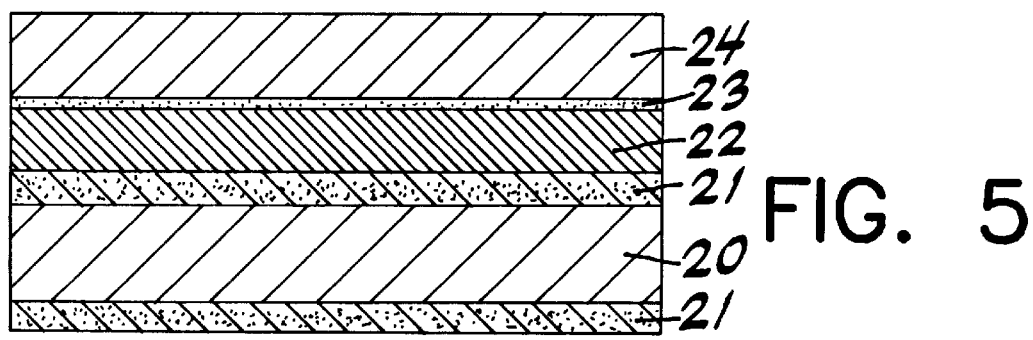

Referring now to FIG. 5, there is shown a further silicon wafer 24 that is coupled to silicon wafer 20. On the side facing silicon wafer 20, silicon wafer 24 has an epitaxial layer 22 that is in turn separated from wafer 24 by a heavily doped layer 23. Silicon wafer 24 has a thickness of a few hundred micrometers. Doped layer 23 is generally thinner than one micrometer, and epitaxial layer 22 is on the order of a few micrometers. The two silicon wafers 24 and 20 are joined by means of a "bonding" process. In this bonding process, the surfaces of the silicon wafers are cleaned and then placed against one another. Heating of this stack then produces a permanent, conforming bond between the two silicon wafers. The thickness of silicon oxide layer 21 remains substantially unchanged, so that the oxide layer provides perfect electrical insulation between epitaxial layer 22 and silicon wafer 20.

In a further step, silicon wafer 24 and the heavily doped layer 23 are then removed, thus yielding a silicon wafer 20 on which an epitaxial layer 22 is arranged, with an insulating silicon oxide layer 21 lying between epitaxial layer 22 and silicon wafer 20. Silicon wafer 24 can, for example, initially be removed by mechanical machining such as grinding. Etching solutions that do not attack the heavily doped layer 23 can then be used to remove silicon wafer 24 with ease and accuracy. Heavily doped layer 23 can then also be removed by mechanical or chemical etching.

Figure 6:
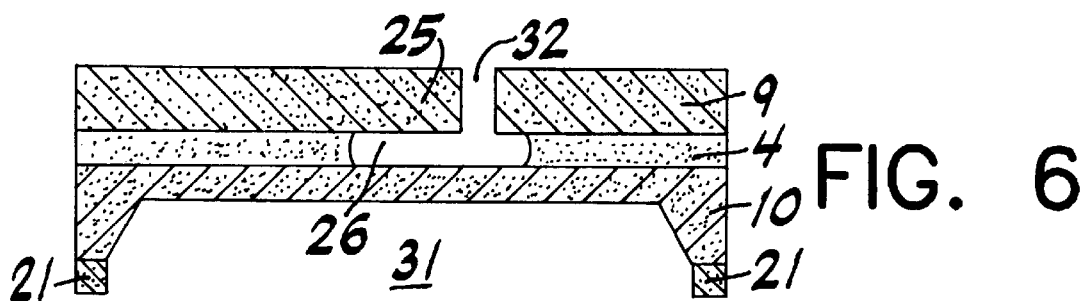

Referring now to FIG. 6, there is shown further processing of the layered configuration of FIG. 5 consisting of epitaxial layer 22, with oxide layer 21 below it, wafer 20 below that, and further silicon layer 21, for the manufacture of sensors. Epitaxial layer 22 yields the first silicon layer 9, silicon oxide layer 21 yields the dielectric layer 4, and the silicon wafer 20 yields the second silicon layer 10. The mechanical structure 25 of first silicon layer 9 is produced by etching structural grooves 32. Undercut etching 26 beneath structure 25 is accomplished by introducing an etching medium that does not attack silicon but does etch dielectric layer 4. The distance to which undercut etching 26 extends beneath structure 25 is controlled exclusively by means of etching time.

In the configuration of resonators 3 shown in FIG. 2, with two mounting blocks 5 and 6 and one vibratory element 7, vibratory element 7 is undercut particularly quickly, since the lateral dimensions in one direction are particularly small. Undercutting beneath mounting blocks 5 and 6 is not complete until a much later point in time, so that when etching is discontinued at the proper time, a dielectric layer 4 remains beneath mounting blocks 5, 6 and thus produces a permanent bond to second silicon layer 10 and to bending element 2.

Structure 25 shown in FIG. 6 is to be understood here only as an example illustrating undercut etching, and does not correspond to resonators 3. Furthermore, FIG. 6 shows a recess 31 by means of which membrane-like bending element 2 is structured out of second silicon layer 10. For this purpose, silicon oxide layer 21 is structured out of the underside and then recess 31 is created by means of an etch solution. Alkaline etch solutions which etch silicon as a function of crystal structure can be used, for example, for etching.

Figure 7:
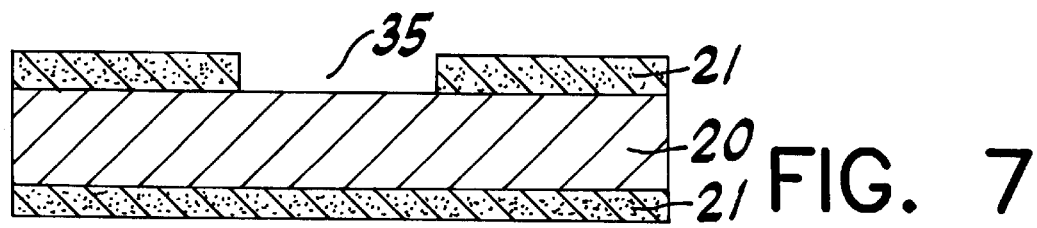
FIG. 7 illustrates a second exemplary embodiment of the method of manufacturing a force sensor according to the present invention.

Referring now to FIG. 7, there is shown a second exemplary manufacturing method for the force sensors according to the present invention. Beginning with a silicon wafer 20 with two silicon oxide layers 21 on the upper and lower side, etching of a pre-etched hole 35 into silicon oxide layer 21 on the top side of silicon wafer 20 creates the structure shown in FIG. 7. Further processing takes place in a manner similar to that described with reference to FIGS. 5 and 6. Unlike these, however, the undercut etching step described with reference to FIG. 6 can be omitted, since the silicon oxide below structure 25 has in fact already been created in this case by pre-etched hole 35. The undercut etching step can thus be omitted.

What is claimed is:

1. A method for manufacturing a force sensor comprising the steps of:
    disposing a dielectric layer between a first silicon layer and a second silicon layer to form a plate;
    forming a resonator from the first layer, the resonator including two mounting blocks and a vibratory element;
    forming a bending element from the second layer, the second layer being positioned below the first layer; and
    undercut-etching the dielectric layer beneath the vibratory element.

2. The method according to claim 1, wherein the force sensor is a pressure sensor.

3. The method according to claim 1, wherein the force sensor is an acceleration sensor.

4. The method according to claim 1, wherein the dielectric layer is composed of a homogeneous material, and further comprising the step of controlling a depth of undercut-etching through varying an etching time.

5. The method according to claim 4, wherein the homogeneous material includes silicon oxide.

6. The method according to claim 1, wherein the first and second layers are formed of monocrystalline silicon.

7. A method for manufacturing a force sensor comprising the steps of:

disposing a dielectric layer having a preetched hole between a first silicon layer and a second silicon layer;

forming a resonator from the first layer, the resonator including two mounting blocks and a vibratory element;

forming a bending element from the second layer, the second layer being disposed below the first layer;

disposing the bending element in a region of the pre-etched hole of the dielectric layer.

8. The method according to claim 7, wherein the force sensor is a pressure sensor.

9. The method according to claim 7, wherein the force sensor is an acceleration sensor.

10. The method according to claim 7, wherein the first and second layers are composed of monocrystalline silicon.

* * * * *